# 2,891,023

COMPOSITIONS CONTAINING AMINO POLYAMIDES AND HEAT REACTIVE PHENOLIC RESINS

Dwight E. Peerman and Don E. Floyd, Minneapolis, Minn., assignors to General Mills, Inc., a corporation of Delaware No Drawing. Application March 9, 1956
Serial No. 570,411

13 Claims. (Cl. 260—19)

This invention relates to new compositions of matter containing polyamide resins and phenol-aldehyde resins and the reaction products of these two resins.

It is an object of this invention to disclose new compositions of matter capable of chemical reaction with each other to produce new reaction products. These reaction products have a wide variety of uses and applications in the fields of protective coatings, moldings, laminating, structural adhesives, B-stage compositions and foam structures. Typical uses are formation of wire and electrical finishes, chemical resistant coatings, abrasive wheels and belts, brake linings, paper base laminated boards, aircraft adhesives and finishes, can coatings, pigmented primers and many others.

Another object of this invention is to disclose compositions capable of producing products which have many desirable characteristics heretofore unobtainable.

A further object of this invention is to teach a "hybrid" type of resin which retains the desirable characteristics of known resins, and in addition the new resin also has new and unique properties of its own.

Other objects and advantages of this invention will become apparent in the subsequent description in the specification.

The two essential ingredients of the compositions employed in the practice of this invention are phenol-aldehyde resins and polyamides. However, as will be explained in detail, not all the known compositions falling within each of these classes of compositions are suitable for the purposes of this invention. Broadly speaking, the compositions which have been found to be satisfactory are the heat-reactive, heat hardening, thermosetting phenol-formaldehyde resins and polyamides of the type disclosed by Bradley, Patent Number 2,379,413 and Cowan et al., Patent Number 2,450,940 but which contain amino groups that are free to react.

Thermosetting phenol-formaldehyde resins of the type employed in this invention are well-known and used commercially on a large scale. In general, they yield hard products and withstand elevated temperatures. On the other hand, they are frequently brittle, have a poor resistance to moisture and alkalies, and have relatively poor impact resistance.

Polyamides containing unreacted amino groups have a fairly recent origin, and have been designated "amino-polyamides" so as to distinguish them from polyamides which are not prepared by using an excess of polyamines. These amino-polyamides have the accompanying advantage of greater fluidity than previous polyamides. Although the precise nature of this type of polyamide is hereinafter set forth in great detail, it should be noted that the word "polyamide" of "amino-polyamide" as used in this specification does not encompass the polyamides commonly referred to as nylon.

The amino-polyamide resins useful in the above compositions are those in which an excess of polyamine is employed in their preparation which results in a polyamide having unreacted amino groups. The amount of these unreacted amino groups can be measured by determining the amine number, the amine number being the number of milligrams of KOH equivalent to the free amine groups in a one gram sample of the resin. Generally speaking, the amino-polyamide resins employed in this invention should have an amine number in the range of 50 to 400 with a preferred range of from 75 to 325.

The polymeric fat acids employed in preparing the amino-polyamide resins are those resulting from the polymerization of drying or semi-drying oils, or their free acids or the simple aliphatic alcohol ester of these acids. Suitable drying or semi-drying oils include soybean, linseed, tung, perilla, cottonseed, corn, sun flower, safflower and dehydrated castor. Suitable fatty acids may also be obtained from tall oil, soapstock and other similar material. In the polymerization process for the preparation of the polymeric fat acids the fatty acids with sufficient double bond functionality combine for the most part, probably by a Diels-Alder mechanism, to provide a mixture of dibasic and higher polymeric fat acids. These acids are often referred to as dimers, trimers, etc. In place of this method of polymerization, any other method of polymerization may be employed whether the resultant polymer possesses residual unsaturation or not. Thus, the term "polymeric fat acids" as used herein is intended to include the polymerized mixture of acids, which usually contain a predominant portion of dimer acids, a small quantity of trimer and higher polymeric fat acids and some residual monomer. Polymerized fatty acids or their esters prepared predominantly from mono-olefinic acids by catalytic processes may also be used.

The polyamines employed to react with the above described polymeric fat acids in the preparation of the amino-polyamide resins have the general formula

$$H_2NR(NHR)_nNH_2$$

where R is an alkylene radical and n is a whole integer less than 6. Illustrative polybasic amines are diethylenetriamine, triethylenetetramine, tetraethylenepentamine, di-1,3-propanetriamine, tri-1,3-propanetetramine, di-1,2-propanetriamine, and the like. Thus, the alkylene radical in the above formula is generally ethylene but should not be limited thereto.

It will be seen that in order to obtain an amino-polyamide resin of the type employed in this invention, having unreacted amino radicals, it is necessary to employ polyamines that are at least tri-functional amines and, generally speaking, at least two amine groups in each molecule will be tied up in the amide linkages. When one of the two amine groups that react to form the amide is a secondary amine, at least one of the terminal primary amines will be free in the form of a branched chain in contrast to a linear amino-polyamide resulting from the reaction of both primary amine groups to form the amide linkages. Under normal conditions the polybasic amine will react with the polymeric fat acids to form a random mixture of branched and linear type linkages.

Phenol-formaldehyde resins, which may be employed in this invention, are heat-reactive, thermosetting resins and are readily available commercial compositions. These resins are copolymers prepared by the condensation of formaldehyde and a phenol in the presence of an alkaline or acidic catalyst. They may be employed by themselves or in the form of a solution. Solvents utilized to prepare solutions of these resins are most commonly the lower aliphatic alcohols such as ethanol and isopropanol. Water solutions of some of these lower molecular weight resins are also available.

Suitable phenolic compounds for the preparation of the phenol-formaldehyde resins are phenol, cresols, xylenols, and various substituted phenols, especially those substituted in the para-position such as p-n-butyl phenol and p-tert-butyl phenol. However, phenol and cresols are preferred. This type of phenol may be characterized by the formula ROH where R is an aryl or alkaryl radical.

Generally speaking, this type of phenol-formaldehyde resins is characterized by the presence of methylol groups which result from the addition of formaldehyde to the aromatic nucleus. In their preparation the ratio of formaldehyde to phenol is generally 0.8 to 1.2 equivalents of formaldehyde to each equivalent of phenolic compound Furthermore, this type of resin is frequently modified with a wide variety of ingredients. Typical modifying materials are polyvinyl butyral, rosins, hexamethylenetetramine, drying oils, and butyl phenols such as p-tert-butyl phenol.

It has been discovered that the amino-polyamide and phenol-formaldehyde resin polymers discussed above react to produce "cross linked" polymers, commonly called copolymers. This reaction proceeds rather slowly at room temperature and is greatly accelerated when the mixtures are heated to 250° to 400° F. In some instances it is desirable to add a catalytic amount of oxalic acid to accelerate cure. During the reaction water is formed and evolved as water vapor. This evolution of water indicates that the principal reaction takes place between the methylol radical (—CH$_2$OH) of the phenol-formaldehyde resin and the unreacted amino groups in the amino-polyamide. The formation of one cross-linkage can be graphically illustrated as follows:

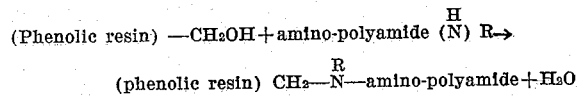

where R represents a hydrogen atom or a continuation of the amino-polyamide. It is readily apparent that a molecule of the phenolic resin may react with more than one molecule of amino-polyamide or with the same amino-polyamide at more than one place and vice versa. It is possible that other reactions not yet fully understood also take place.

The ratio of phenol-formaldehyde resins to amino-polyamides may be varied within the range of mixtures containing 5 to 75 parts by weight phenol-formaldehyde and 25 to 95 parts by weight of amino-polyamide. It is desirable to employ proportions of ingredients such that a stoichiometric amount of free amine groups in the amido-polyamide are present to react with most of the methylol and other reactive groups of the phenol-formaldehyde resins with free amino groups of the amido-polyamides although this is not always necessary. Preferred ratios of these ingredients will vary within the above range depending upon the specific application or use to which it is to be employed and cost of the ingredients as well as the relative reactivity of the specific ingredients.

This invention is illustrated further by reference to the following examples. All "parts" are expressed as parts by weight.

EXAMPLE I 25 parts of a heat reactive phenol-formaldehyde resin sold by Bakelite Company as BR 14634 were added to 75 parts of an amino-polyamide made from dimerized fatty acids and triethylene tetramine and having an amine number of 215. After thoroughly blending this mixture by vigorous stirring, the mixture was heated to 122° C. for 12 hours during which time bubbles of gas evolved. At the end of this time the mixture had solidified into a tough copolymer which had excellent impact resistance and retained its impact resistance at temperatures as low as 10° F. Graphic illustration of this fact is that the reaction product at 10° F. was struck sharply with a steel hammer without its shattering.

Electrolytic tin-coated steel plates coated with this composition and heat cured were also prepared. These plates at temperatures as low as 10° F. had good impact resistance.

EXAMPLE II

The same reactants used in Example I were mixed thoroughly in the ratio of 40 parts phenol-formaldehyde resin and 60 parts amino-polyamide. During the mixing and heat curing at 110° C. a "foam" structure resulted which was extremely hard and rigid. The volume of this foam was three times greater than the volume of the original reactants. Upon testing the foam which had a density of 0.31 gram per cubic centimeter, it was observed to have a compressive strength of 220 pounds per square inch.

Broadly speaking, rigid foam structures similar to those of Example II are envisioned which have at least 2.5 times the initial volume of the reactants, a density in the range of 0.25 to 0.50 gram per cubic centimeter and a compression strength of at least 150 pounds per square inch.

EXAMPLE III

A solution of an amino-polyamide having an amine number of 215 made from dimerized fatty acids and triethylene tetramine in a solvent containing equal amounts of isopropanol and toluene was added to a denatured ethyl alcohol solution of a phenolic resin prepared by reacting phenol and formaldehyde to obtain a typical one-stage molding resin and subsequently modified by the addition of polyvinyl butyral. This mixture contained 50% solvent and 50% phenol-formaldehyde and amino-polyamide reactants which were present in the ratio of 2 parts phenolic resin to 3 parts amino-polyamide.

Fiber glass cloth was dipped into the above solution and the solvent allowed to evaporate. Strips of the fiber glass impregnated in this manner were placed between two pieces of 24ST aluminum. Pressure was applied so as to mate the surface and the specimen heated to 300° F. for 30 minutes. The test portions cut from the aluminum sheets bonded in this fashion had a tensile shear strength of 1420 pounds per square inch.

Aluminum sheets bonded with fiber glass cloth impregnated in this manner which had been stored at 80-90° F. for 2 and 4 weeks had tensile strengths of 1120 and 975 pounds per square inch, respectively.

EXAMPLE IV

A solution of an amino-polyamide having an amine number of 90 prepared from dimerized fatty acids and diethylene triamine in a solvent composed of equal parts isopropanol and toluene was mixed with a phenol-formaldehyde resin sold by the Bakelite Company as BR 7929. This solution contained 50% solvent and 50% of the reactants in the proportion of 3 parts amino-polyamide to 2 parts of the phenol-formaldehyde resin.

Glass fiber cloth was dipped into the above solution and the solvent allowed to evaporate for about 1 hour from the impregnated glass fiber. Six layers of the impregnated cloth were heated to 300° F. while maintained under a pressure of 100 pounds per square inch, which resulted in a rigid, well-formed laminate.

The same fiber glass cloth after storage at 80° to 90° F. for one month still produced a strong, rigid laminate when treated in the above fashion.

EXAMPLE V

A solution having a viscosity of J-K on the Gardner-Holdt scale of an amino-polyamide having an amine number of 309 and a heat-reactive phenol-formaldehyde resin derived from the reaction of cresol and formaldehyde was prepared by mixing equal portions of these two ingredients. An electrolytic tin-coated steel plate was sprayed with this solution which produced a hard durable coating after curing at 400 F. for 15 minutes. This coating had a Sward hardness of 71 and a Barcol impact test of more than 30 inch pounds. This coating was highly resistant to 50% H₂SO₄, 20% NaOH, organic solvents, and other chemicals and could also withstand outdoor exposure for an extended period.

EXAMPLES VI TO XVIII

A polyamide resin made from dimerized fatty acids and diethylene triamine and having an amine number of approximately 90 was dissolved in a 1:1 mixture of isopropanol and toluene to 50% nonvolatile content. The solution was blended with phenolic resin solutions at 50% solids in alcohol as shown in Examples VI and VII in Table I. Similarly, a polyamide made from dimerized fatty acids and triethylene tetramine and having an amine number of about 215 was dissolved to make a 60% solution in a 1:1 mixture of isopropanol and toluene. This was blended with phenolic resins as shown in Examples VIII to XIII in Table I. A polyamide resin of amine number near 309, made from dimerized fatty acids and tetraethylene pentamine was treated similarly. Examples XIV to XVIII cover blends of this solution with phenolic resin solutions.

From these blends clear films were cast on tin plate and glass with a 1.5 mil blade. The films were baked 15 minutes at 400° F. and subject to the tests shown in the table I. The Sward Rocker was used to determine the hardness on the films on glass. A Gardner Impact Tester was used to check impact resistance of the films on tin plate and the values given represent the maximum values passed. The films were immersed in solvents and chemicals as shown and effect of immersion noted (H=hard, SS=slightly softened, S=softened, FG=film gone).

Thus, novel reaction products of two previously well-known resins have been discovered and these new products (resins) possess certain properties far superior to those of the reactants themselves. They represent tough, non-brittle, products which are resistant to many chemicals and have a high heat resistance. Other desirable features of these products are their enhanced machinability, punchability, and high impact resistance. For instance, it is possible to cold punch paper base laminated products if it is advantageous to do so. In many applications it will be desirable to add inert fillers such as clays, paper, and other cellulosic material, finely ground metals, abrasives, etc. to the reaction mixtures and such products are considered to be within the scope of this invention. Another feature which makes them highly valuable in respect to their being commercially acceptable for all types of applications is that they do not emit or release noxious or corrosive fumes while being cured at room or elevated temperatures.

The combined resins may be stored at room temperature for several weeks without deterioration. For example, solutions of 50% solids contents are stable at room temperature for about 3–6 weeks and may be stored for much longer times when refrigerated.

Obviously, many modifications and variations of the invention as hereinbefore set forth may be made without departing from the spirit and scope thereof, and therefore only such limitations should be imposed as are indicated in the appended claims.

Now, therefore, we claim.

1. Copolymers resulting from the reaction of amino-

Table I

| Example | Amine No. of Polyamide | Phenolic Resin Used | Ratio of Polyamide Phenolic | Gardner Viscosity [2] | Rocker Hardness | Impact Resistance (inch-lbs.) | 14 days in 3% NaCl | JP-4 jet fuel | Solvent Resistance at 120° F. for 48 hours | | |
|---|---|---|---|---|---|---|---|---|---|---|---|
| | | | | | | | | | Water | Oleic Acid | Skydrol 500 |
| VI | 90 | [1] BR17913 | 60/40 | W | 47 | 12 | H | H | H | H | H |
| VII | 90 | [1] BV914 | 25/75 | Z-1 | 57 | +30 | H | H | SS | H | H |
| VIII | 215 | [1] BV1112 | 40/60 | Z-2 | 58 | 18 | H | H | H | H | H |
| IX | 215 | [1] BV1112 | 50/50 | Z-3 | 56 | +30 | H | H | H | H | H |
| X | 215 | [1] BR7929 | 60/40 | V | 49 | 24 | H | H | SS | H | H |
| XI | 215 | [1] BR17692 | 50/50 | Z-1 | 56 | 12 | H | H | H | H | H |
| XII | 215 | [1] BR10282 | 50/50 | Z | 48 | +30 | H | H | SS | H | H |
| XIII | 215 | [1] BV914 | 25/75 | X-Y | 49 | +30 | H | H | H | FG | S |
| XIV | 309 | [1] BR17913 | 50/50 | Z | 70 | 18 | H | H | H | H | H |
| XV | 309 | [1] BV1112 | 50/50 | Z-Z-1 | 70 | 20 | H | H | H | H | H |
| XVI | 309 | [1] BV914 | 25/75 | Z-2 | 62 | +30 | H | H | H | SS | H |
| XVII | 309 | [1] BR10282 | 50/50 | J-K | 71 | +30 | H | H | H | FG | SS |
| XVIII | 309 | [1] BR14634 | 50/50 | H | 67 | 26 | H | H | H | FG | S |

[1] Sold by Bakelite Co.
[2] Measured at 50N non-volatile content.

EXAMPLE XIX

A paper-base laminate was prepared in the following manner. Cotton rag paper was dipped into the solution below:

```
                                                          Parts by wt.
Phenolic resin prepared by reacting cresol and formaldehyde with an
  alkaline catalyst (approx. 60% nonvolatile content)_____ 100
Amido-polyamide resin from dimerized fatty acids and triethylene
  tetramine, having amine number of about 215_____ 40
2-ethoxy ethanol_____ 200
Isopropanol_____  60
```

In preparing this solution, the polyamide was dissolved in isopropanol, the phenolic resin added, and the mixture diluted with 2-ethoxyethanol.

The dipped sheets were air-dried overnight. Then laminates approximately ⅛₆ inch thick and 7 inches square were prepared from 11 plies of the treated paper by treatment at 300° F. and 800 p.s.i. pressure for 2 hours. Hard, tough products were obtained. They were not delaminated on soaking in acetone. It was possible to punch these laminates, without shattering or crazing at a temperature as low as 85° F.

polyamides derived from polymeric fat acids and an excess of polyamines having the general formula,

$$H_2N-R(NH-R)_nNH_2$$

where R is an alkylene radical and n is an integer less than 6, said polyamide having an amine number of from 50–400 and heat reactive thermosetting phenol-formaldehyde resins in which the ratio of said amino-polyamide to said phenol-formaldehyde resins is at least in the range of 25 to 95 parts by weight of amino-polyamide and 5 to 75 parts by weight phenol-formaldehyde resin.

2. Compositions of claim 1 in which R is ethylene.

3. Compositions of claim 1 in which said polyamide has an amine number in the range of 75 to 350.

4. Compositions of claim 1 in which the phenol-formaldehyde resin is prepared by reacting phenol and formaldehyde.

5. Compositions of claim 1 in which the phenol-formaldehyde resin is prepared by reacting cresol and formaldehyde.

6. Compositions of matter suitable for preparing the reaction products of claim 1 composed of polyamides derived from polymeric fat acids and an excess of polyamines having the general formula, $$H_2N\!-\!R(NH\!-\!R)_nNH_2$$

where R is an alkylene radical and $n$ is an integer less than 6, and heat reactive thermosetting phenol-formaldehyde resins in which the ratio of said amino-polyamide to said phenol-formaldehyde resins is at least in the range of 25 to 95 parts by weight of amino-polyamide and 5 to 75 parts by weight phenol-formaldehyde resin.

7. Compositions of claim 6 in which R is ethylene.
8. Compositions of claim 6 in which said polyamide has an amine number in the range of 75 to 350.
9. Compositions of claim 6 in which the phenol-formaldehyde resin is prepared by reacting phenol and formaldehyde.
10. Compositions of claim 6 in which the phenol-formaldehyde resin is prepared by reacting cresol and formaldehyde.
11. Compositions of matter composed of amino-polyamides having an amine number of 75 to 350 derived from the reaction of polymeric fat acids and an excess of polyamines selected from the group consisting of diethylenetriamine, triethylenetetramine, and tetraethylenepentamine and heat reactive thermosetting phenol-formaldehyde resins in which said resin is prepared by reacting formaldehyde and a phenol selected from the group consisting of phenol and cresol and contains unreacted methylol radicals in which the ratio of said amino-polyamide to said phenol-formaldehyde resins is at least in the range of 25 to 95 parts by weight of amino-polyamide and 5 to 75 parts by weight phenol-formaldehyde resin.

12. Copolymers resulting from the reaction of the compositions of claim 11, said reaction yielding water as a by-product.
13. The reaction products of claim 12 which have been reacted to form a B stage resin by carrying out the reaction at about room temperature.

References Cited in the file of this patent
UNITED STATES PATENTS

| | | |
|---|---|---|
| 2,653,880 | Hendricks et al. | Sept. 29, 1953 |
| 2,662,865 | Beauchamp | Dec. 15, 1953 |
| 2,663,649 | Winkler | Dec. 22, 1953 |
| 2,695,908 | Wittcoff et al. | Nov. 30, 1954 |

OTHER REFERENCES

"A Classification of Bakelite Varnish Making Resins," publication of the Bakelite Corp., received 1942, page 3.

"Polyamide Resin Suspensoids," General Mills Bulletin, New Product Data Sheet, Revision D, dated October 20, 1950, pages 13–14.